No. 610,747. Patented Sept. 13, 1898.
J. RIDDELL.
GRADE DELINEATOR.
(Application filed Dec. 17, 1896.)

(No Model.) 2 Sheets—Sheet 1.

WITNESSES
A. H. Abell,
B. B. Hill.

INVENTOR:
John Riddell
By E. W. Cady
atty

THE NORRIS PETERS CO., PHOTO-LITHO., WASHINGTON, D. C.

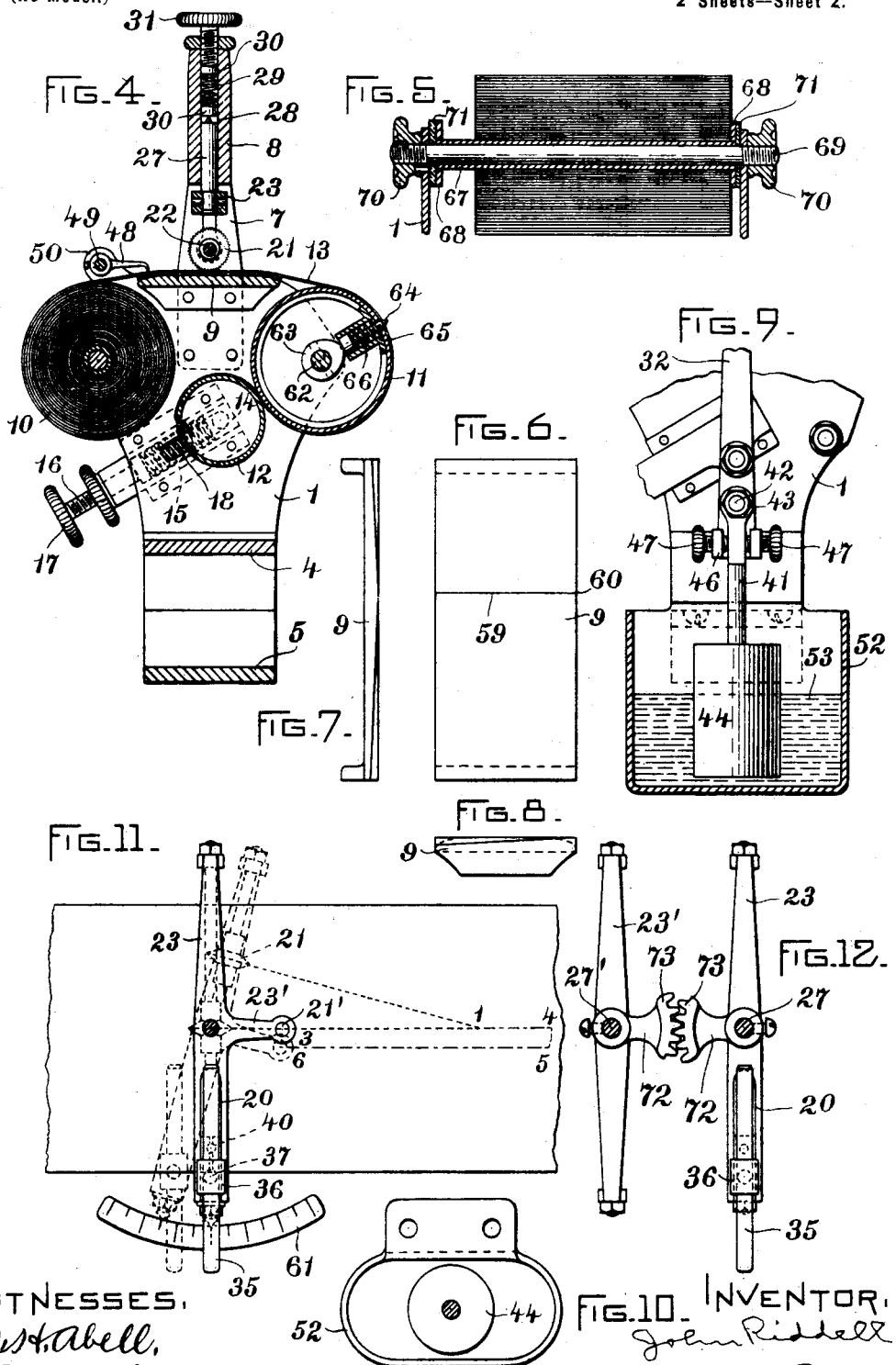

UNITED STATES PATENT OFFICE.

JOHN RIDDELL, OF SCHENECTADY, NEW YORK.

GRADE-DELINEATOR.

SPECIFICATION forming part of Letters Patent No. 610,747, dated September 13, 1898.

Application filed December 17, 1896. Serial No. 615,985. (No model.)

*To all whom it may concern:*

Be it known that I, JOHN RIDDELL, a citizen of the United States, residing at Schenectady, county of Schenectady, State of New York, have invented certain new and useful Improvements in Grade-Delineators, of which the following is a specification.

This invention has for its object to delineate the grade of a route traveled over by a vehicle, to measure the distance of the route and scale of the same, and provide a permanent record of the grade, scale of distance, and outline of the route traveled over by a vehicle.

The invention comprises in its general features an improved delineator adapted to be attached to and operated by a vehicle or moved by hand and having a mechanism for carrying and operating a movable recording-surface and apparatus automatically actuated by the advance of the vehicle and also by its forward and rearward inclination or tilting movement to delineate on said recording-surface the line of the path traveled over and its grade, and also to record a scale and length of the distance traveled over.

The invention consists in a machine and in details thereof for delineating the path and its grade and measuring and recording the length of a route traveled over by a vehicle, as hereinafter set forth and claimed.

Figure 1:
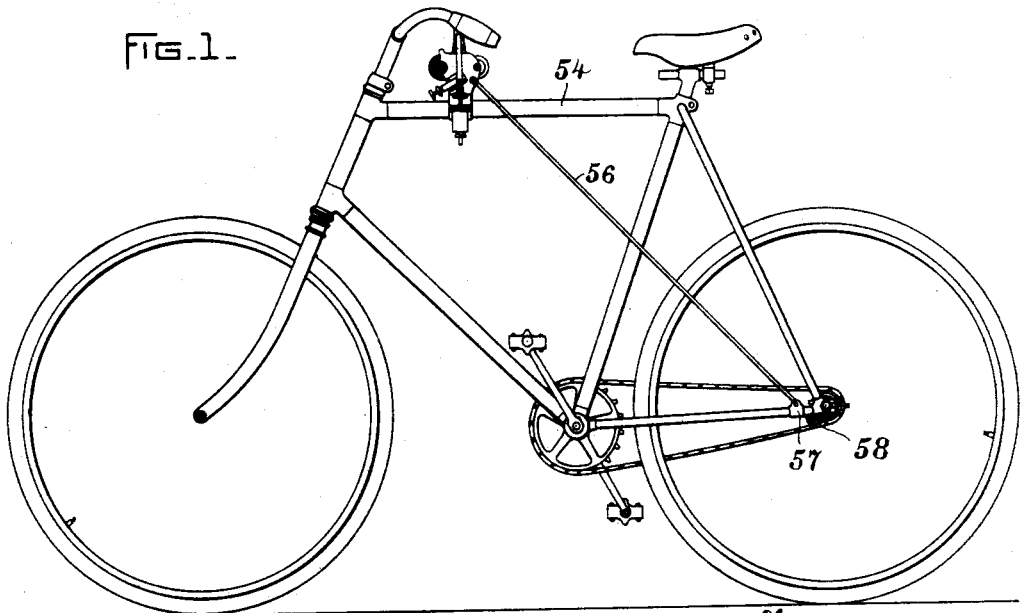
Figure 1:
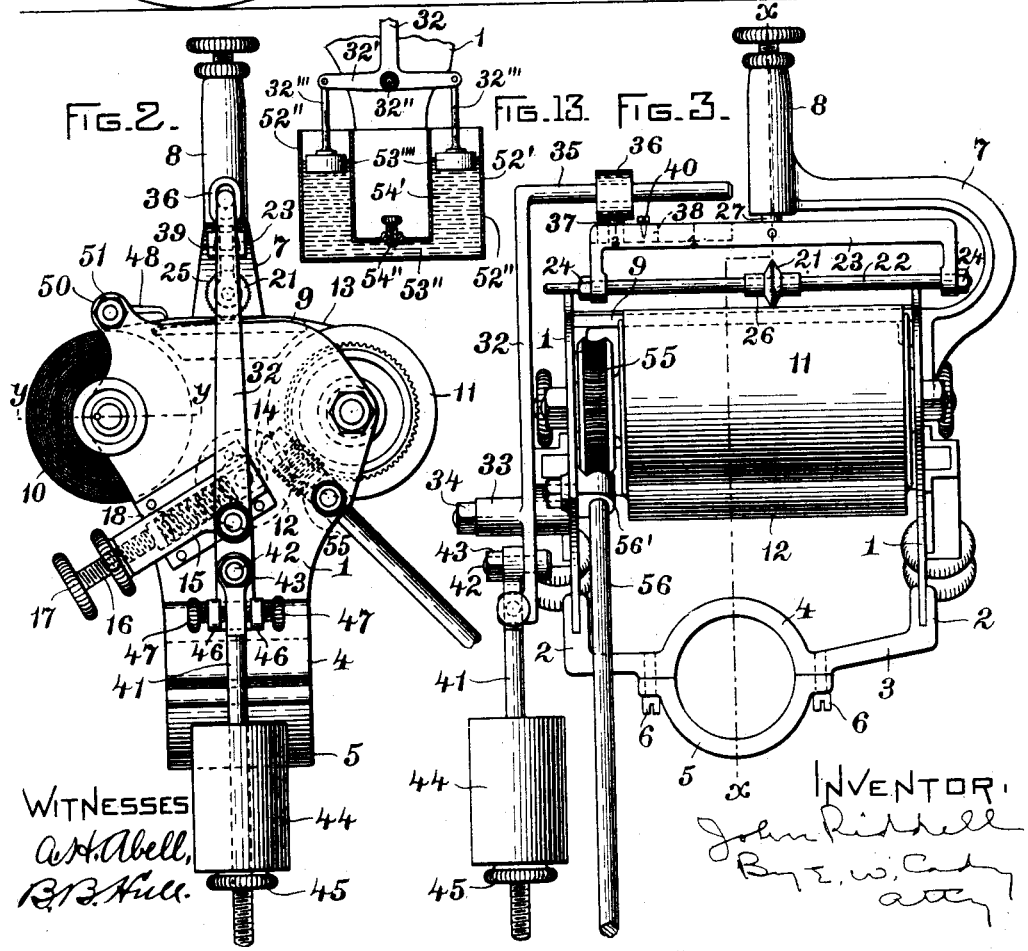

Referring to the accompanying drawings, Figure 1 illustrates the invention as applied to a bicycle. Fig. 2 is an enlarged side view of the invention detached from the vehicle. Fig. 3 is a rear view thereof. Fig. 4 is a side view in vertical section on the line $x\ x$, Fig. 3. Fig. 5 is a detail view, in horizontal section, on the line $y\ y$, Fig. 2, of one of the rolls on which the recording-surface is wound. Figs. 6, 7, and 8 are detail views of the bed-plate or supporting-surface over which the recording-surface travels and against which the marker bears. Fig. 9 is an enlarged detail view of a dash-pot and pendulum connected with the marker. Fig. 10 is a plan view of the dash-pot and pendulum. Fig. 11 is a plan view of a portion of the recording-surface and the mechanism on which the marker is mounted. Fig. 12 is a modification of the mechanism referred to in Fig. 11, and Fig. 13 is a modification of the device shown in Fig. 9.

The device embodying the invention may be of any size and adapted to be attached to any kind of a vehicle, so as to be operated by the running-gear of the latter, and also to be effected by the tilting endwise of the vehicle, or it may be moved by hand.

To illustrate the manner of carrying out the invention, it is here shown as applied to a bicycle.

The marking and recording device, embracing a frame having mounted therein rollers carrying the recording paper or tape and an automatic apparatus for delineating and recording the grade of a path traveled over, is as here shown in this illustration of the application of the invention of a small size and adapted to be secured to the frame of a bicycle.

The frame in which the rollers and delineating and recording apparatus is mounted may consist, as shown, of a pair of vertical side plates 1, mounted in the upturned ends 2 of a cross-piece 3, formed with a cylindrical central portion 4, having a separable part 5, secured in place by screws 6, by means of which the frame may be secured to the frame of a bicycle. The frame further consists of a curved bracket 7, mounted on one of the side plates 1 and extending horizontally across and between the side plates 1 to a pivot about midway between the latter, where it terminates in a vertical arm or bracket 8. Bridging the side plates 1 and secured thereto to their tops is a bed-plate 9, serving as a support for the paper or tape on which the delineation is made and against which the marker bears.

10, 11, and 12 are rollers carrying the tape or paper on which the delineation is recorded. These rollers have their bearings in the side plates 1, the rollers 10 and 11 being arranged one on each side of the plate 9 and the roller 12 below the rollers 10 and 11 and adjacent to the roller 11. The tape or paper 13 is wound on the roller 10, extends over the bed-plate 9 and over and partly around the roller 11, and is wound up on the roller 12 as it is moved from the roller 10. The roller 11 is driven by the movement of the bicycle, as hereinafter set forth, and the roller 12 is operated by its pressure against and friction with the roller 11. In order to keep the roller 12 pressed against the roller 11 and also to compensate for the increase in diameter of the roller 12 as the paper is wound up on it, the roller 12 is made yielding and adjustable toward its bearings in blocks 14, mounted and adapted to slide in diagonal grooved ways 15, secured to the side plates 1. The blocks 14 are each adjusted by a screw 16, having a handle 17, thereby adjusting the roller 12 in position relative to roller 11, and the roller 12 has a yielding bearing against roller 11 by means of coiled springs 18, each located behind a block 14 and regulated as to tension by the screw 16, as shown in Figs. 3 and 4.

The marker is mounted in a frame adapted to vibrate or oscillate by any suitable means, such as a pendulum or other device, which automatically vibrates the frame through the endwise tilting movement of the bicycle. The marker, as here shown, consists, preferably, of a marking wheel or disk 21, loosely mounted thereon—that is, so as to not only freely turn on but also slide endwise on a rod 22, extending endwise above the bed-plate 9. The rod 22 is mounted in a vibrating frame consisting of a bar 23, having downturned ends, in which is supported the rod 22, held in place by nuts 24. The marker 21 may be of any suitable construction and material to mark a line, preferably having a toothed edge 25, as shown, and a sleeve 26, turning and sliding freely on the rod 22. Secured to and projecting upward from the bar 23 is a short pivotal arm or rod 27, extending into a hole or perforation 28 through the arm 8. Located in the hole 28, above the upper end of the rod 27, Fig. 4, is a coiled spring 29, having a washer 30 at each end, and at the top of the arm 8 is a set-screw 31, located in the upper end of the hole 28 and adapted to compress the spring 29. By this means a yielding pressure may be given to the marker 21, and adjusted as desired, or the spring 29 may be omitted and the marker bear on the recording-surface by its own weight.

The frame in which the marker is mounted is vibrated by the tilting endwise of the bicycle, preferably through a weighted lever arranged as follows: An angular lever 32 is pivoted to one of the side plates 1. This lever is formed with a vertical portion having near its lower end a tubular bearing 33, mounted to turn on a pin projecting from one of the side plates 1 and held in place by a nut 34 on the end of said pin. The upper end of the vertical portion of the lever 32 is formed with a horizontal arm 35 at a right angle to the vertical portion and extending over one end of the bar 23. The arm 35 projects through an eyepiece or oval loop-piece 36, having a pin 37, located and adapted to turn in a block 38, dovetailed and adapted to slide in a dovetailed groove 39 in the bar 23, as shown in Fig. 2 and in dotted lines in Figs. 3 and 11. The block 38 is held in place from sliding by means of a set-screw 40. Adjacent to the lower end of the lever 32 is secured a short rod 41 by means of a pin 42 and nut 43. Upon said rod 40 is mounted a pendulum-weight 44, held in adjusted position by a thumb-nut 45. The lower end of the lever 32 is provided with two lateral projections or ears 46, between which extends the rod 41, and impinging against each side of the rod 41 is a set-screw 47, projecting through an ear 46. It will be seen by the foregoing construction that as the bicycle on which the machine is mounted is tilted forward or backward the bar 23 will swing to a position in front or at the rear of its normal position, and the loop-piece 36 will slide on the arm 35, the loop-piece 36 turning like a swivel on the block 38.

It will be found to be of assistance in computing the irregularities made by the marker 21 on the tape, as hereinafter explained in describing the operation of the device, to provide an auxiliary marker, as follows: An auxiliary marker 48 is located centrally between the ends of and at the forward edge of the bed-plate 9, and is suitably mounted on a rod 49, having its ends inserted in ears or projections 50 of side plates 1 and secured by nuts 51. The marker 48 traces a central line on the tape 13, with which line the line marked by the marker 21 may be compared. Other auxiliary markers similar to the central marker 48 may be also mounted on the rod 49, by means of which the irregularities of the grade recorded by the marker 21 can be at once determined. Since the pendulum-weight 44 and its lever are apt to vibrate too freely as the vehicle moves over very uneven short surfaces in the line of travel, it is desirable to provide some means for counteracting undue vibration and the consequent irregularities in the line which would be marked on the paper by the vibration of the frame or bar 23 and the rod 22. Any suitable means may be employed for this purpose—as, for example, as shown in Fig. 9, in which the weight 44 is suspended in a dash-pot 52, secured to the side plate 1. The dash-pot is supplied with glycerin or other suitable liquid 53, which will sufficiently retard the weight against any tendency to slight vibrations, but permit it to move sufficiently in the regular operation of the machine.

While a pendulum has been set forth in connection with the marker-frame, the invention is not limited thereto, as any suitable means may be used in place of the pendulum which will act on or control the oscillating marker-frame to shift it to one side or the other of its normal position as the machine is tilted endwise, forward, or backward. To illustrate another means in lieu of the pendulum, the modification shown in Fig.

13 is set forth, as follows: A receptacle 52' is secured to the side plate 1 in lieu of the dash-pot 52, and in place of the arm 41 and weight 44 the lower end of lever 32 is formed with a cross-bar 32', the lever 32 and cross-bar 32' being pivoted to the side plate 1 at the point 32'', and the former pivotal point of lever 32 is dispensed with. The receptacle 52' is formed with the vertical side chambers 52'', connected at their lower ends by a transverse chamber 53''. Suspended in each chamber 52'' is a rod 32''', hinged at the upper end to an end of the cross-bar 32' and having at the lower end a float 53'''', resting on the surface of a liquid 54' in the chambers 52'' and 53''. By means of the foregoing device as the machine is tilted the liquid 54', maintaining its equilibrium, will act on the floats 53'''' and vibrate the lever 32 to control the oscillation of the marker-frame. The flow of the liquid through the chamber 53'' is preferably governed by a suitable valve—as, for example, the set-screw 54''—thus regulating the action of the liquid on the floats 53''''. The chamber 53'' is of such a size that the set-screw 54'' will be sufficient to govern the flow of the liquid through said chamber.

The sides of the dash-pot 52 adjacent to the weight 44 are located so close to the latter, as shown in Fig. 10, that the flow of the liquid between the weight and sides of the dash-pot is limited, thereby aiding and preventing the swing of the weight against slight vibrations.

The recording mechanism thus far described is mounted on the top horizontal bar 54 of a bicycle, at its forward part, adjacent to the handles, as shown in Fig. 1, by securing the ring part 4 of the bar 3 to the bar 54.

The rollers 10, 11, and 12 may be driven by connecting them in any suitable way with the driving-gear of the vehicle. In the present example the roller 11 is driven from the rear axle of the bicycle by means of a worm-gear 55, (shown in Figs. 2 and 3,) mounted on the shaft of roller 11, and a rod 56, having its upper end resting in a bearing 56', mounted on side plate 1 and extending downward to a support 57 on the frame of the bicycle and terminating in a worm-gear 58 on the rear axle of the bicycle, as shown in Fig. 1.

To provide against the tendency of the marker 21 to be drawn forward with the paper, the surface of the bed-plate 9 may be formed in a particular way, reference being had to Figs. 6, 7, and 8.

Since the width of the roller 11 is, owing to the space occupied by the worm-gear, less than the length of the bed-plate 9, the line marked by the marker will be at one side of the center of the bed-plate, or as indicated by the line 59. The right of the bed-plate 9 in Figs. 6 and 8 is the front edge thereof, and on each side of line 59 the surface of the bed-plate 9 tapers rearward and laterally to the rearward outer corner of the bed-plate, the outer upper corner being higher than at the point 60 in the front edge of the plate 9. By means of this construction any tendency of the marker 21 by its teeth engaging the paper 13 to be drawn forward is counteracted, the inclination of the surface of the plate preventing the same.

61 indicates a graduated scale-plate affixed to the top of side plates 1 and beneath the arm 35, by means of which the calibration of the marking apparatus can be effected, as hereinafter set forth.

In connection with roller 11 is shown a device for measuring and recording the distance traveled over, preferably constructed as follows: Upon a stationary shaft 62, about which the roller 11 revolves, is a fixed or stationary cam 63, against which bears the rear end of an endwise-movable pin 64, located in a casing 65, opening out from and projecting inward from the periphery of the roller 11. The rear end of the pin 64 is held in constant contact with the cam 63 by means of a coiled spring 66 encircling the pin 64. The pin 64 is shown in Fig. 4 as having been pressed outward by the cam 63, so as to puncture the paper 13. As the roller 11 revolves and the rear end of the pin 64 travels over the cam 63 the pin 64 is forced backward by the spring 66, bringing its point clear of the paper, and in this way once in every revolution of the roller 11 the pin 64 is forced outward by the cam to puncture the paper. The distance traveled in one revolution of the roller 11 may be gaged by the number of teeth in the worm-gear driving the roller 11. As, for example, in the illustration the worm 58 will be formed with four threads, and the gearing with roller 11 will be such with reference to the gear-wheel of the bicycle that the roller 11 will revolve once during every quarter of a mile traveled over, and the pin 64 will once in every revolution of the roller 11 mark a quarter of a mile, the scale being twenty inches to the mile.

The driving mechanism may be modified so as to obtain any desired scale. The distance traveled may therefore be estimated from the record on the paper by the number of punctures made by the pin 64, the space between each two successive punctures representing a mile or any graduated fraction of a mile. A suitable mark or figure may be made at the point of puncture by any suitable means, and a number of pins 64 may be arranged lengthwise of the roller 11, whereby a gradation in the scale of the distance traveled over may be recorded on the paper.

The invention embraces, broadly, a marking device operating as set forth, and comprises either a single marking device or a number of marking devices, as set forth. The roller 10 may be removably mounted in position in any suitable manner to place the paper thereon and remove it therefrom. As shown in Fig. 5, it is formed with a tube 67, on which the paper is wound, having flanged ends 68. A rod 69 extends through the tube 67 and the side plates 1, and is held in place by thumb-nuts 70 on its threaded ends, washers 71 being interposed between the flanged ends 68 of the tube 67 and the side plates 1.

The operation of the invention is as follows: The marker and its frame being in their normal position—that is, as shown in Figs. 2, 3, and 4, at a right angle to the paper lengthwise, or its direction of travel—this position is maintained as long as the grade of the path traveled over is level. The proper pressure of the marker 21 may be obtained by adjusting the tension of the spring 29. The bicycle being driven, the roller 11 will be revolved by the worm-gear connection with the rear axle, as described, and will rotate the roller 12 by means of the friction therewith of the roller 11. In this way the tape or paper 13 will be drawn to unwind the latter from roller 10, the tape 13 passing over the bed-plate 9, part way over roller 11, and being wound up on roller 12. As the paper 13 travels over the bed-plate 9 the marker 21, pressing against the paper 13, will mark a straight line lengthwise of the paper 13, which will be a line coincident with a line marked on the paper by the marker 48 in alinement with the marker 21. If for any reason the paper should not run straight from roller 10 to roller 11, the line made by the marker 48 and any member of marker 48 will be the true straight line or lines indicating the path traveled over, and the line, straight and irregular, marked by the marker 21 and outside of the line or lines marked by the marker 48 or markers 48 may be compared with the latter line or lines and the grade of the path traveled over computed therefrom. Now when the bicycle in traveling passes over irregularities or variations in the grade of the path traveled over and the bicycle tilts forward or backward the weight 44 maintains its normal position, and when the frame carrying the marker 21 vibrates or swings on its pivotal point the frame assumes a position in a line diagonal with or at an angle to its normal position on one side thereof if the bicycle is tilted forward and on the other side thereof if the bicycle is tilted backward, in either position the marker 21 moving or sliding in one direction or the other correspondingly on the rod 22 by the paper drawing the same. By means of this combined vibrating movement of the marker-frame and the sliding movement of the marker on the rod 22 an irregular line is marked on the paper, departing from and returning to the normal straight line outlined by marker 48, as well as marker 21 in its normal position, said irregular line truly and accurately delineating the grade of the path traveled over, and the variations in the grade may be calculated by the central line marked by the marker 48, and to facilitate the reading a number of parallel lines may be drawn by markers 48.

To set forth more particularly the operation of the marker 21 and also to show how the height of an up or down grade may be delineated for computation, reference is had to Fig. II. In this illustration the frame or bar 23 is shown with a modified construction which may be used—that is, with a short arm or projection 23' at its pivotal point, adapted to carry a depending pencil or marker 21'. The bicycle has reached and ascended an upgrade, as indicated by the inclined dotted line 1 2 made by the marker 21'. The marker 21' and its frame are shown in full lines in their normal position and in dotted lines in the angular position automatically assumed by the rearward tilting of the bicycle, the marker 21' in marking the line 1 2 having moved over on the rod 22 to the position shown in dotted lines. The dotted straight line 1 3 shows the normal central line made by a marker 48. The transverse dotted line 4 5 shows the line made by the pencil 21' when the arm 23' is swung by the change from its normal position of the bar 23, and the dotted straight line 5 6 shows the line traced by the pencil 21' as the line 1 2 is made by the marker 21. The line 4 5 indicates the angle of the grade, and the line 5 6 the length of the grade. In this way by the swinging of the arm 23' in one direction or the other the angle of the up or down grade will be marked and may be compared with lines marked by markers 21 and 48 and is used as a check for 21.

In Fig. 12 a modification is shown in which a second frame and marker are employed, the bar 23' of the second frame being suitably mounted in a bracket (not shown) by a central pivot-rod 27' and connected to the bar 23 by the arms 72, mounted on the bars 23 and 23', respectively, and having the segment-gears 73 meshing with each other. By means of this construction the line delineated by a single marker may be duplicated on either side of the central line of travel and the grades thereof may be compared and computed with reference to the central line.

From the foregoing it will be seen that the marker 21 will delineate the level and up and down grades of the path traveled over by a vehicle from start to finish, the marker recording a straight line for the level portions of the route and irregular lines for the ascents and declivities in the grade. The proper normal position of the marker and its frame and the pendulum may be determined by experiment with the invention and the vehicle. A route being traversed in a continuous line from start to finish and it being found that the line at the finish made by the marker does not coincide with that made at the starting-point, the marker-frame may be calibrated by adjusting the position of the weight 44 by means of the set-screws 47, which will adjust the marker-frame to the proper normal position.

By the operation of this invention a permanent and accurate record of the grade of a path or route traveled over may be obtained—as, for example, a strip of paper 13 on which will be delineated by the marker 21 a line indicating accurately the straight and irregular portions of the grade traveled over and also a standard straight line by the marker 48 or standard straight lines by markers 48, over or adjacent to which the line made by marker 21 is carried or traced and with which the latter line may be compared and computed. The angles of the line made by the marker 21 with the standard line or lines delineated indicate the up and down grades of the path traveled over, said angles being on either side of the standard line, as the case may be.

While specific details of construction for carrying out the invention have been set forth, the invention is not limited thereto, as various means may be employed for producing substantially the same results. The invention broadly contemplates a movable recording-surface and a marker apparatus adapted to normally record a straight line indicating a path traveled over by a vehicle and automatically movable by the endwise tilting of said vehicle to record and delineate the irregularities in the grade of the path traveled over, the recording-surface and marker apparatus being adapted to be mounted on and driven by a vehicle.

Having thus described my invention, what I claim is—

1. A device for delineating, recording and measuring the path of a route traveled over, adapted to be mounted on and operated by a vehicle, and consisting of a mechanism for carrying and operating a movable recording-surface, a marker-supporting frame extending over the plane of the recording-surface and automatically vibratable, as the vehicle tilts endwise, to either side of its normal position, and a marker loosely mounted on said frame and automatically movable endwise thereon, when the vehicle is in a tilted position, as and for the purpose set forth.

2. A device for delineating, recording and measuring the path of a route traveled over, adapted to be mounted on and operated by a vehicle, and consisting of a mechanism for carrying and operating a traveling recording-surface actuated by the vehicle, a marker-frame automatically vibratable over the plane of said recording-surface to one side or the other of its normal position by the tilting endwise of the vehicle, a marker automatically movable endwise on its frame when the vehicle is tilted, and a fixed device for marking the central line of travel of the vehicle, as set forth.

3. In a device for delineating, recording and measuring the path of a route traveled over, an oscillating marker-frame and a marker automatically movable endwise on said frame, as set forth.

4. A device for delineating, recording and measuring the path of a route traveled over, adapted to be mounted on and operated by a vehicle and embracing mechanism for carrying and operating a tape or traveling band of paper, an oscillating frame extending transversely over the plane of said tape and governed by a pendulum, and a roller-marker automatically movable endwise on said oscillating frame, as and for the purpose set forth.

5. In a device for delineating, recording and measuring the path of a route traveled over, adapted to be mounted on and operated by a vehicle, mechanism for carrying and operating a movable recording-surface, an oscillating frame extending across the plane of said recording-surface, a marker mounted and automatically movable endwise on said oscillating frame, and means connected with and automatically moving the latter from and to its normal position when the vehicle is tilted endwise from and back to its normal position, as set forth.

6. In a device for delineating, recording and measuring the path of a route traveled over, adapted to be mounted on and operated by a vehicle, mechanism for carrying and operating a movable recording-surface, an oscillating frame extending over the plane of said recording-surface, a marker mounted and automatically movable endwise on said oscillating frame, an automatic marking device arranged to mark and indicate on the recording-surface at intervals, graduated sections of the distance traveled over, and means connected with and governing the movements of the oscillating marker-frame by the endwise tilting of the machine, as set forth.

7. In a device for delineating, recording and measuring the path of a route traveled over, adapted to be mounted on and operated by a vehicle, a mechanism for carrying and operating a traveling recording tape or strip of paper, an oscillating frame extending across the plane of said recording-tape, and a roller-marker loosely mounted on said frame and automatically movable endwise thereon, as set forth.

8. In a device for delineating, recording, and measuring the path of a route traveled over, adapted to be mounted on and operated by a vehicle, a mechanism for carrying and operating a movable recording-surface, a fixed marker, an oscillating frame, and a marker mounted on said frame and automatically movable endwise thereon, as set forth.

9. In a device for delineating, recording and measuring the path of a route traveled over, adapted to be mounted on and operated by a vehicle, a mechanism for carrying and operating a movable recording-surface, an oscillating frame having a central arm and marker thereon, and a marker automatically movable endwise on said frame, as herein set forth.

10. In a device for delineating, recording and measuring the path of a route traveled over, adapted to be mounted on and operated by a vehicle, a mechanism for carrying and operating a movable recording-surface, an oscillating frame, a marker automatically movable endwise thereon, a pendulum controlling the movement of said oscillating frame, and means for retarding and governing the pendulum against undue vibration, as set forth.

11. In a device for delineating, recording and measuring the path of a route traveled over, adapted to be mounted on and operated by a vehicle, a mechanism for carrying and operating a movable recording-surface, an oscillating frame, a marker movable endwise on said frame, a pendulum controlling the movements of said frame, and a dash-pot governing the vibrations of said pendulum, as set forth.

12. In a device for delineating, recording and measuring the path of a route traveled over, adapted to be mounted on and operated by a vehicle, a mechanism for carrying and operating a movable recording-surface, an oscillating frame, a marker automatically movable endwise on said frame, and a pendulum connected to and governing said frame by a swiveled sliding connection, as set forth.

13. A device for delineating, recording and measuring the path of a route traveled over, adapted to be mounted on and operated by a vehicle, and comprising a mechanism for carrying and operating a traveling recording-surface, a fixed standard-marker, an oscillating frame, a marker automatically movable endwise on said frame, and a pendulum connected to and governing the movements of said frame, as set forth.

14. A device for delineating, recording and measuring the path of a route traveled over, comprising a mechanism for carrying and operating a movable recording-surface, a number of fixed markers, an oscillating frame and a marker mounted on said frame and automatically movable endwise thereon when the device is in an endwise-tilted position, as set forth.

15. In a device for delineating, recording and measuring the path of a route traveled over, a mechanism for carrying and operating a movable recording-surface, an oscillating marker-frame, means connected with and governing the movements of said marker-frame, as the machine is tilted endwise, said endwise-tilting movement causing the marker-frame to oscillate, and a marker mounted on said marker-frame and automatically movable endwise thereon by the movable recording-surface, when the machine has assumed an endwise-tilted position, as set forth.

16. A device for delineating, recording and measuring the path of a route traveled over, comprising a mechanism for carrying and operating a movable recording-surface, an oscillating frame movable by the endwise tilting of the machine, a marker adapted to bear against the recording-surface and mounted and automatically movable endwise on said oscillating frame by the movable recording-surface when the oscillating frame has assumed a position at an angle to its normal position, and means connected with and governing the movements of the oscillating marker-frame by the endwise tilting of the machine, as set forth.

17. A device for delineating, recording and measuring the path of a route traveled over, consisting of a machine comprising a mechanism for carrying and operating a movable recording-surface, a number of fixed markers adapted to bear on said recording-surface, an oscillating frame movable by the endwise tilting of the machine, a marker adapted to bear against the recording-surface and mounted and automatically movable endwise on said oscillating frame by the movable recording-surface when the oscillating frame has assumed a position at an angle to its normal position, an automatic marking device adapted to mark and indicate on the recording-surface at intervals graduated sections of the distance traveled over, and means connected with and governing the movements of the oscillating marker-frame by the endwise tilting of the machine, as set forth.

18. In a device for profiling a route traveled over, the combination of a marker, a support for the marker, and means for causing an angular movement of the marker across a recording-surface.

19. In a device for profiling a route traveled over, adapted to be mounted on a vehicle and operated thereby, the combination of means for continuously moving the recording-surface as the vehicle progresses, a marker, a support upon which the marker is movable, and means for changing the position of the support as the profile of the route varies, whereby the marker is permitted to travel across a recording-surface at an angle and indicate the profile of the route.

20. In a device for profiling a route traveled over, the combination of a marker, and means for causing the marker to travel across a recording-surface at an angle whenever a grade occurs in the route.

21. In a device for profiling a route traveled over, the combination of a marker, means for causing the marker to travel across a recording-surface at an angle whenever a grade occurs in the route, and means for adjusting the relation of the marker to the recording-surface whereby the vertical scale of the apparatus may be the same as or different from the longitudinal scale.

22. In a device for profiling a route traveled over, carried by a vehicle, the combination of means for imparting movement to a recording-surface, a marker adapted to travel across said surface at an angle, means for adjusting this angle when a grade occurs in the route, and means for making the vertical scale of the record greater than that of the horizontal.

23. In a device for profiling a route traveled over, adapted to be mounted on and operated by a vehicle, the combination of a marker adapted to move across a recording-surface at an angle whenever a grade occurs on the route, and means permitting the marker to be manually adjusted with respect to the recording-surface whenever the grade is of such extent that the marker tends to leave the recording-surface.

In witness whereof I have hereunto set my hand this 15th day of December, 1896.

JOHN RIDDELL.

Witnesses:
PERCY T. M. BECKETT,
GEO. C. REILLEY.